(12) United States Patent
Kim et al.

(10) Patent No.: US 8,274,482 B2
(45) Date of Patent: Sep. 25, 2012

(54) CONTROLLING POINTER MOVEMENTS ON A TOUCH SENSITIVE SCREEN OF A MOBILE TERMINAL

(75) Inventors: Tae Hun Kim, Incheon-si (KR); Boem Young Woo, Gyeonggi-do (KR); Jeong Hyuk Yoon, Seoul (KR); Hyun Ju Ahn, Seoul (KR); Seung Sook Han, Gyeonggi-do (KR); Jun Serk Park, Seoul (KR); Ho Sang Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 667 days.

(21) Appl. No.: 11/752,174

(22) Filed: May 22, 2007

(65) Prior Publication Data

US 2007/0273664 A1 Nov. 29, 2007

(30) Foreign Application Priority Data

May 23, 2006 (KR) .................. 10-2006-0046064

(51) Int. Cl.
*G06F 3/041* (2006.01)
(52) U.S. Cl. .................. 345/173; 345/157; 178/18.01
(58) Field of Classification Search .......... 345/173–178, 345/156, 157, 160, 179, 180; 178/18.01, 178/18.06, 18.07; 715/856
See application file for complete search history.

(56) References Cited

U.S. PATENT DOCUMENTS

| 5,376,946 | A | * | 12/1994 | Mikan | 345/157 |
|---|---|---|---|---|---|
| 5,808,604 | A | * | 9/1998 | Robin | 715/862 |
| 6,278,443 | B1 | * | 8/2001 | Amro et al. | 345/173 |
| 6,321,131 | B1 | * | 11/2001 | Kumada et al. | 715/840 |
| 6,411,283 | B1 | * | 6/2002 | Murphy | 345/173 |
| 7,737,954 | B2 | * | 6/2010 | Kim | 345/173 |
| 2002/0080123 | A1 | | 6/2002 | Kennedy et al. | |
| 2002/0196238 | A1 | * | 12/2002 | Tsukada et al. | 345/173 |
| 2003/0146905 | A1 | * | 8/2003 | Pihlaja | 345/173 |
| 2006/0149624 | A1 | * | 7/2006 | Baluja et al. | 705/14 |
| 2006/0274046 | A1 | * | 12/2006 | Hillis et al. | 345/173 |
| 2007/0097096 | A1 | | 5/2007 | Rosenberg | |

FOREIGN PATENT DOCUMENTS

| EP | 1674976 | 6/2006 |
|---|---|---|
| GB | 2355086 | 4/2001 |
| JP | 6051908 | 2/1994 |
| KR | 2001-108361 | 12/2001 |
| KR | 1020010108361 | 12/2001 |
| KR | 2003-82968 | 10/2003 |
| KR | 1020030082968 | 10/2003 |
| WO | 03/054681 | 7/2003 |

* cited by examiner

*Primary Examiner* — Joe H Cheng
(74) *Attorney, Agent, or Firm* — Lee, Hong, Degerman, Kang & Waimey

(57) ABSTRACT

A system for managing a graphical user interface (GUI) pointer on a touch sensitive screen of a mobile communication terminal is provided. The system comprises a logic unit for displaying a pointer on a first display point on the screen in response to a user touching the screen at a first touch point on the screen, wherein the first display point is a first distance away from the first touch point.

24 Claims, 8 Drawing Sheets

CONTROLLING POINTER MOVEMENTS ON A TOUCH SENSITIVE SCREEN OF A MOBILE TERMINAL

CROSS REFERENCE TO RELATED APPLICATION

This application claims the benefit of Korean Patent Application No. 10-2006-0046064, filed on May 23, 2006, which is hereby incorporated by reference as if fully set forth herein.

FIELD OF THE INVENTION

The present invention relates to a method for selecting an item displayed on a touch-screen display of a limited display mobile terminal, and more particularly to a method and system for controlling movement of a pointer on a touch sensitive screen of a mobile terminal.

BACKGROUND

Recently, an improved mobile communication terminal equipped with a touch-screen-type display has been developed and introduced to the market. As functions of the mobile communication terminal have become more complicated and more diverse, the number of icons displayed on the display of the mobile communication terminal has increased, and the size of each icon displayed has been reduced.

Therefore, a user of the mobile communication terminal equipped with the above-mentioned touch-screen has difficulty in selecting a desired icon from among a plurality of icons without using a stylus pen. This is inconvenient, particularly when a user prefers to use his finger to select a desired icon.

Systems and methods are needed that can overcome the above-mentioned shortcomings.

SUMMARY

A method for managing a graphical user interface (GUI) pointer on a touch sensitive screen of a mobile communication terminal is provided. The method comprises displaying a pointer on a first display point on the screen, in response to a user touching the screen at a first touch point on the screen; and wherein the first display point is a first distance away from the first touch point.

The method may further comprise touching the screen on a second touch point for moving the pointer from the first display point to a second display point, wherein the second display point is approximately the first distance away from the second touch point. The moving comprises dragging the pointer from the first display point to the second display point by sliding a pointing object on the touch sensitive screen from the first touch point to the second touch point.

In one embodiment, a pointing object is used to touch the screen and, due to a display point being a distance away from a touch point on the screen, the pointer is visible to a user without the pointing object obstructing the user's view of the pointer. Input may be provided to the mobile communication terminal in a first manner to move the pointer from the second display point to a third display point, wherein the third display point is a second distance away from the second touch point and wherein the second distance is longer or shorter than the first distance.

In another embodiment, input is provided to the mobile communication terminal to move the pointer from the second display point to a third display point where a GUI object is displayed. In response to a first object contacting the second touch point in a first manner, the pointer moves from the first distance away from the second touch point to a second distance away from the second touch point. In some embodiments, in response to the first object contacting the second location in a first manner, the pointer rotates about the second touch point. A display object in vicinity of the pointer may be selected in response to a second user interaction with the mobile terminal.

Depending on implementation, the second user interaction may comprise the user discontinuing touching the screen, the user selecting from a GUI menu, or the user interacting with a pointing device of the mobile communication terminal. The pointing device may be at least one of a joystick, a touchpad, and a key on a keypad of the mobile communication terminal. Preferably, the user has an option between using at least one of the joystick, the touchpad, and the key on the keypad of the mobile communication terminal to control movement of the pointer on the display.

In accordance with another embodiment, a method for selecting a GUI object on a display screen of a mobile communication terminal is provided. The method comprises displaying a pointer on the display screen at a first display point, in response to a user touching the display screen at a first touch point on the display screen, wherein the first display point is a first distance away from the first touch point; and moving the pointer proximate to a GUI object on the display screen by touching the display screen at a second touch point.

In one embodiment, the method further comprises selecting the GUI object when the pointer is displayed a first distance from the GUI object and/or selecting the GUI object in response to discontinuing touching the display screen at the second touch point. Touching the display screen at the second touch point in a first manner causes the pointer to move toward a closest GUI object in vicinity of the pointer. The touching in the first manner may tapping or continued touching of the screen for a predetermined time period.

In accordance with yet another embodiment, a system for selecting a GUI object on a display screen of a mobile communication terminal is provided. The system comprises a logic unit for displaying a pointer on the display screen, in response to a user touching the display screen at a first touch point on the display screen, wherein the first touch point is a first distance away from display position of the pointer on the screen; and a logic unit for moving the pointer proximate to a GUI object on the display screen, in response to a user touching the display screen at a second touch point.

The system may further comprise a logic unit for selecting the GUI object when the pointer is displayed a first distance from the GUI object, or in response to discontinued touching of the display screen at the second touch point. In one embodiment, touching the display screen at the second touch point in a first manner causes the pointer to move toward a closest GUI object in vicinity of the pointer.

In accordance with another embodiment, a system for managing a graphical user interface (GUI) pointer on a touch sensitive screen of a mobile communication terminal is provided. The system comprises a logic unit for displaying a pointer on a first display point on the screen in response to a user touching the screen at a first touch point on the screen, wherein the first display point is a first distance away from the first touch point.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENT

The following has been discussed by way of example as applicable to mobile communication terminals such as mobile phones. It should be noted, however, that the scope of the invention is not limited to the following exemplary embodiments. The principals and advantages discussed can be applied to other devices such as PDAs (Personal Digital Assistants), game devices, and KIOSK terminals (e.g., ATMs (Automatic Teller Machines).

Figure 1:
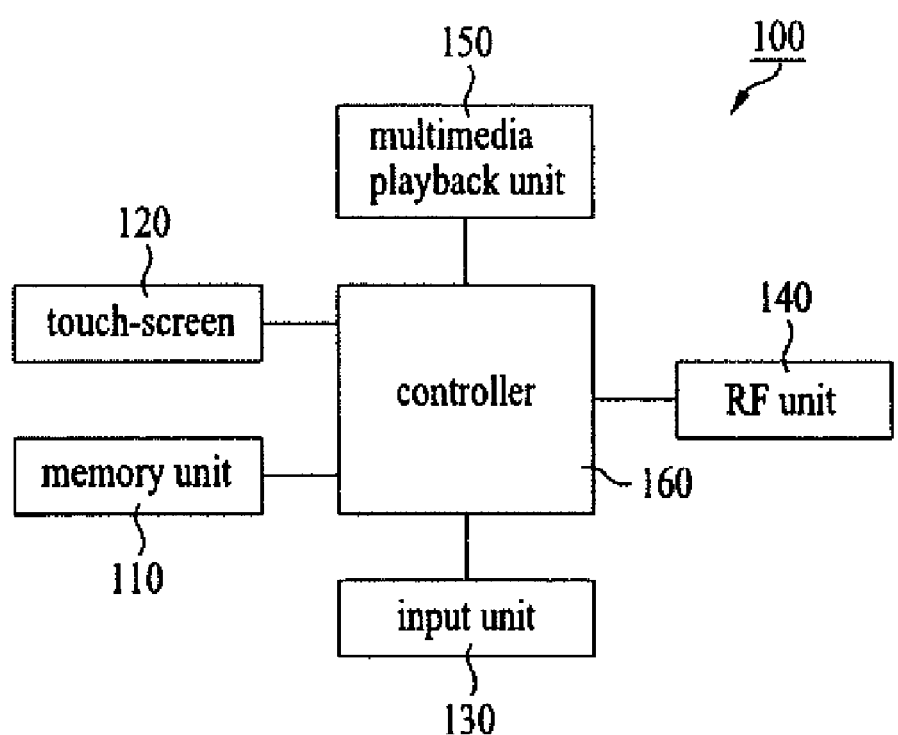
FIG. 1 is a block diagram of the components of a mobile communication terminal according to one embodiment.

Referring to FIG. 1, the mobile communication terminal 100 according to one embodiment comprises a memory unit 110, a touch-screen 120, an input unit 130, a Radio Frequency (RF) unit 140, a multimedia playback unit 150, and a controller 160. The mobile communication terminal may include not only the above-mentioned components but also other components (e.g., a camera).

The memory unit 110 stores software programs for driving a plurality of functions for the mobile terminal 100 and the associated data (e.g., an MP3 file, an image file, a moving-image file, a document file, a list of phone-numbers, a list of transmission/reception calls, a list of SMS transmission/reception messages, a list of E-mails, and a list of Multimedia Message Service (MMS) messages.

The touch-screen 120 may display a variety of icons (e.g., an MP3-file icon, a moving-image file icon, an image-file icon, a document-file icon, and a program-execution icon) for performing a variety of functions. Also, the display 120 may display the list of phone numbers, transmission/reception calls, and SMS transmission/reception messages. Hereafter, each of the above-mentioned icons or each of the above-mentioned lists are referred to as an "item."

The above-mentioned touch-screen 120 may be configured by at least one of an electrostatic capacitive method, a resistive overlay method, an infrared beam method, a surface acoustic wave method, an integral strain gauge method, a piezo-electric method, on a functional equivalent. The touch-screen 120 allows the user to select a desired icon from among a variety of icons displayed thereon, and serves as an input unit for entering a command and/or information in the mobile communication terminal 100.

The mobile communication terminal 100 may comprise an additional input unit 130 (e.g., a keypad, a touch-wheel, a touch-pad, and a voice recognition device, etc.) other than the above-mentioned touch-screen 120. The RF unit 140 processes a variety of RF signals to allow the mobile communication terminal 100 to communicate with an external device via a voice-call service or SMS service.

The multimedia playback unit 150 allows a variety of multimedia information to be reproduced by the mobile communication terminal 100. The term "multimedia playback" indicates that a variety of moving-image files and music files and a variety of mobile broadcast programs based on terrestrial/satellite DMB (Digital Multimedia Broadcasting) services of Republic of Korea, a MediaFlo (Media Forward Link Only) service of United States, and a DVB-H (Digital Video Broadcasting-Handheld) service of Europe are received and displayed (reproduced).

Therefore, the multimedia playback unit 150 according to one embodiment may include components for receiving/reproducing mobile broadcast data. The multimedia playback unit 150 may also be included in the controller 160. The controller 160 controls all operations of the terminal including the memory unit 110, the touch-screen 120, the input unit 130, the RF unit 140, and the multimedia playback unit 150. The controller 160 controls the item selection method to be implemented in the mobile communication terminal 100 according to one embodiment.

A first preferred embodiment of the present invention will hereinafter be described with reference to FIGS. 2A-2D, and FIG. 3. FIGS. 2A-2D illustrate images displayed on a mobile communication terminal associated with an item selection method. FIG. 3 is a flow chart illustrating an item selection method according to a first preferred embodiment.

Figure 2A:
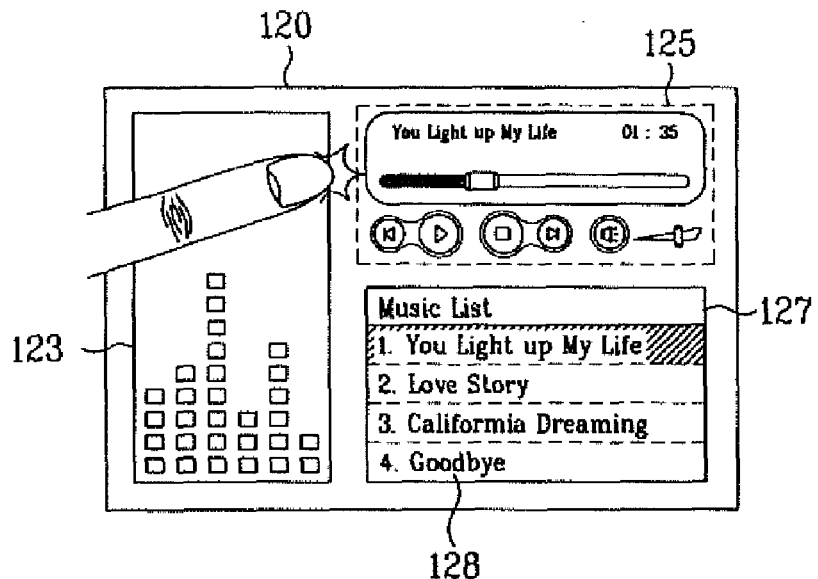
FIGS. 2A-2D are exemplarily illustrations of an item selection method according to a first preferred embodiment.
Figure 3:
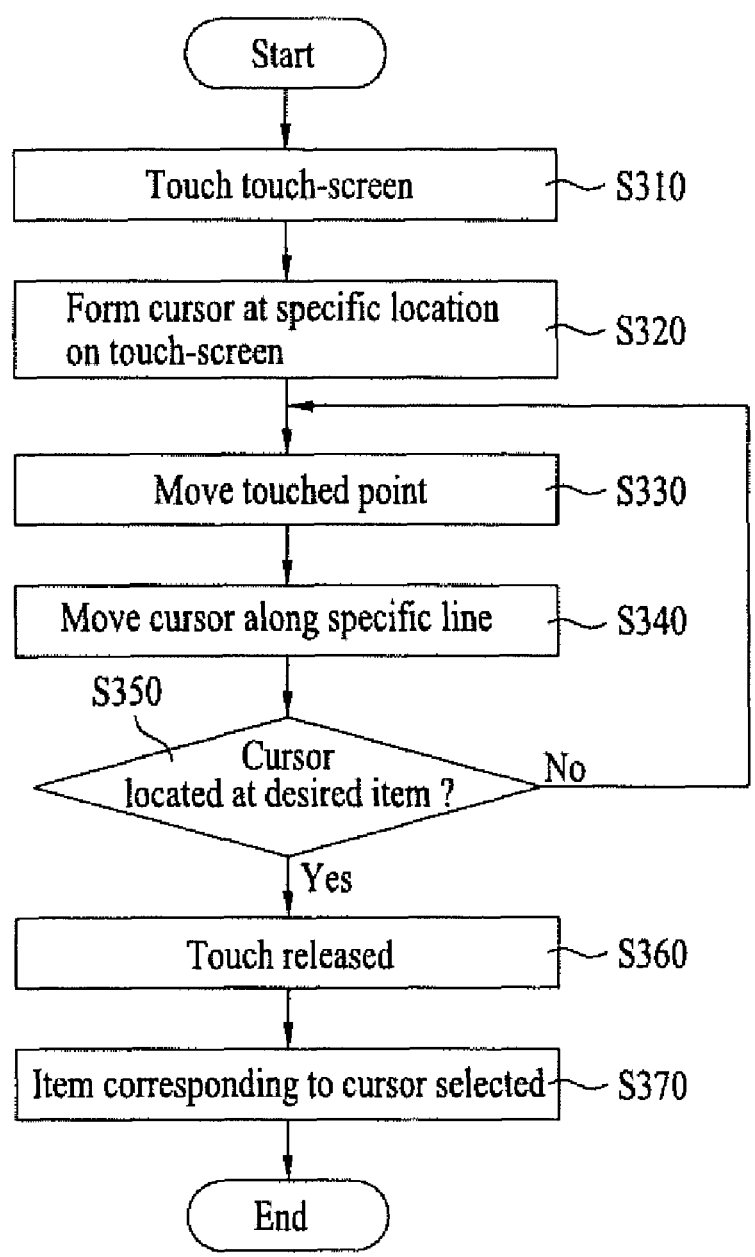
FIG. 3 is a flow chart illustrating an item selection method according to the first preferred embodiment.

Referring to FIG. 2A, the touch-screen 120 of the mobile communication terminal 100 includes an equalizer area 123, an MP3 music file playback area 125, and an MP3 music file list area 127. According to a first preferred embodiment, a method for selecting an item entitled "Goodbye" (hereinafter referred to as a "target music item") will be described.

In order to implement the item selection method according to a first preferred embodiment, it is preferable that environmental setup data may be pre-established to allow a desired item to be selected by a cursor of a touch-screen. Referring to FIG. 3, the user of the mobile communication terminal 100 touches a predetermined point on the touch-screen 120 using his or her fingers (S310). Preferably, environmental setup data may be established not to select an item corresponding to the selected point, if the user touches the item corresponding to the selected point.

Figure 2B:
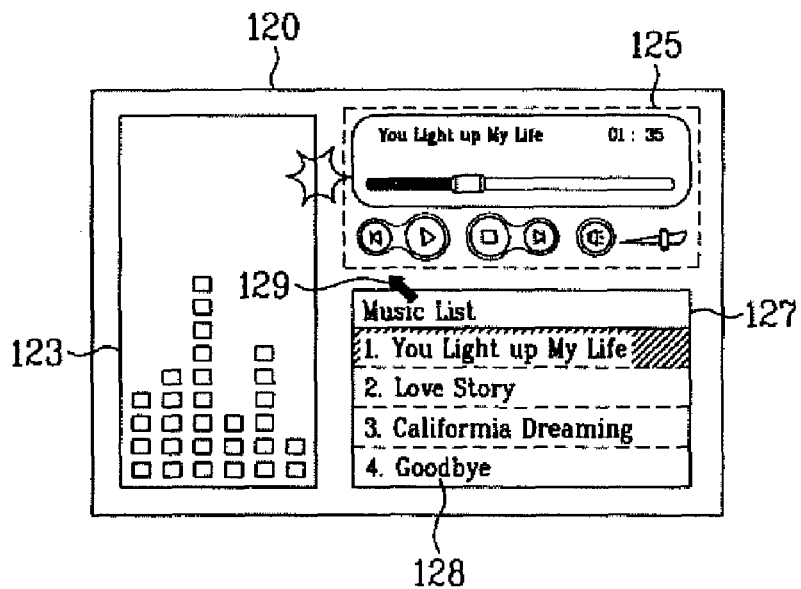

Referring to FIG. 2B, a cursor 129 is formed at a first point of the touch-screen 120 (S320). The first point may be predetermined to be any locations of the touch-screen. However, it is preferable that the first point be located at the center part of the touch-screen in consideration of vertical/horizontal mobility of the cursor 129. The user of the mobile communication terminal moves the touched point along a predetermined line by maintaining his touch on the display (S330).

Figure 2C:
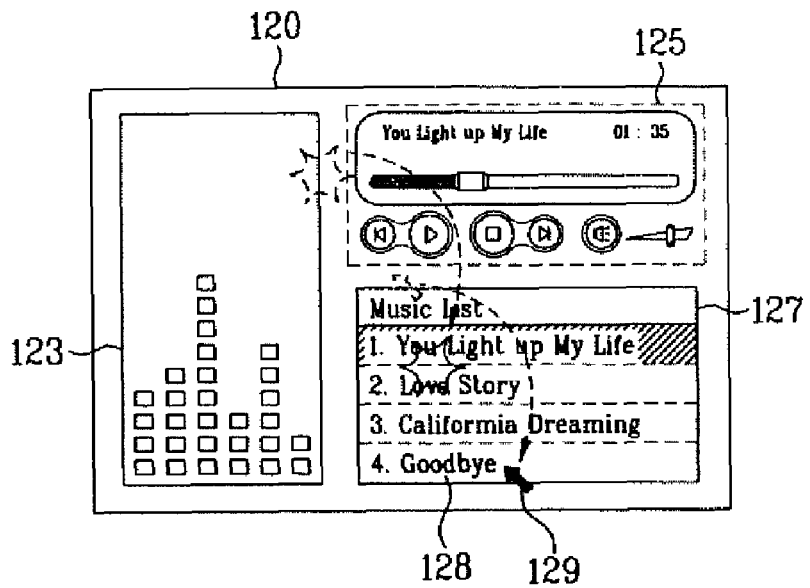

Referring to FIG. 2C, the cursor 129 moves by maintaining the initial distance between the aforementioned touched point and the cursor, forming the same line as the line of touch of the user (S340). The user of the mobile communication terminal 100 can move the touched point to another point based on the moving line of the cursor 129 until the cursor 129 is located at the target music item 128. If the cursor 129 is not located at the target music item 128, the above-mentioned processes are repeated (S350).

Figure 2D:
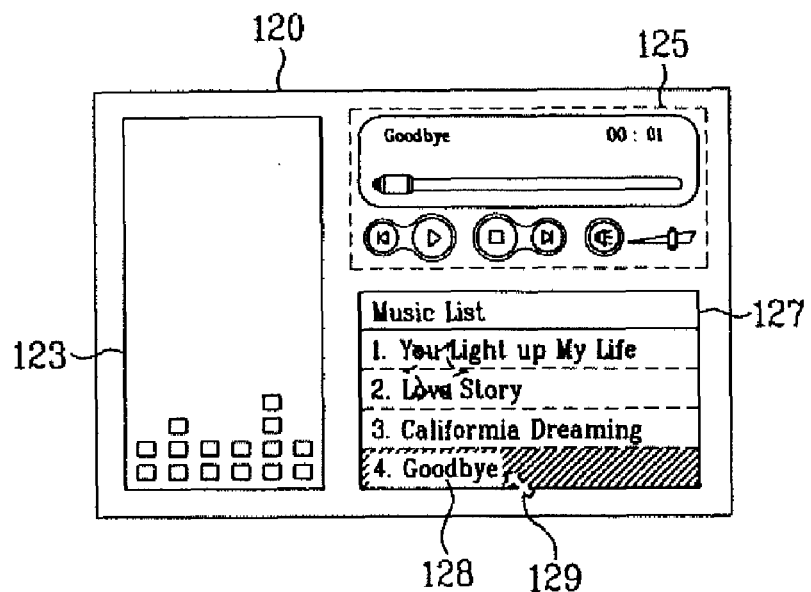

If the cursor 129 is located at the target music item 128, the user of the mobile communication terminal 100 takes his or her finger off of the touch-screen 120 (S360), such that the above-mentioned target music item 128 is selected (S370), as shown in FIG. 2D. As described above, if the user touches a first point on the touch-screen 120, a corresponding cursor is created. When the user takes his or her finger off of the touch-screen 120, the cursor 129 disappears, and at the same time an item corresponding to the cursor location is selected.

In some embodiments, the cursor may also be displayed on the touch-screen 120 before the user touches the screen. And, in some embodiments, the target music item 128 is not selected when the user takes his or her finger off of the touch-screen 120. For example, the target music item 128 may be selected by an additional input unit 130 of the mobile communication terminal 100 after the user removes his finger.

Figure 4A:
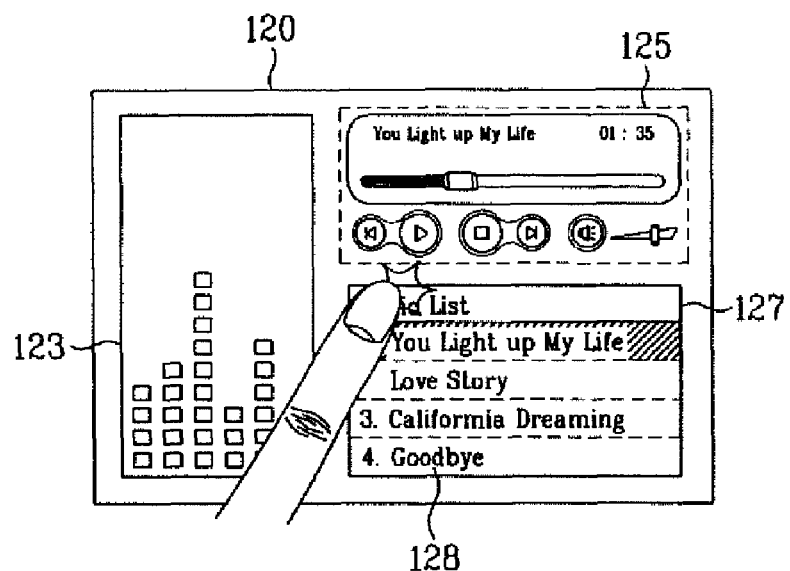
FIGS. 4A-4E are exemplarily illustrations of a mobile communication terminal to explain an item selection method according to a second preferred embodiment.

A second preferred embodiment of the present invention will hereinafter be described with reference to FIGS. 4A-4E, and FIG. 5. FIGS. 4A-4E illustrate exemplarily images displayed on a mobile terminal according to a second preferred embodiment. As shown in FIG. 4A, the touch-screen 120 of the mobile communication terminal 100 according to a second preferred embodiment comprises an equalizer area 123, an MP3 music file playback area 125, and an MP3 music file list area 127.

According to a second preferred embodiment, it is preferable that environmental setup data may be pre-established to allow a desired item to be selected by a cursor displayed on the touch-screen display 120. Referring to FIG. 4A, for example, the user of the mobile communication terminal 100 touches a predetermined point on the touch-screen 120 using his or her fingers (S510). As a result, a cursor 129 is displayed at a first point spaced apart from the point touched by the user and at a predetermined distance and position (S520).

Figure 4B:
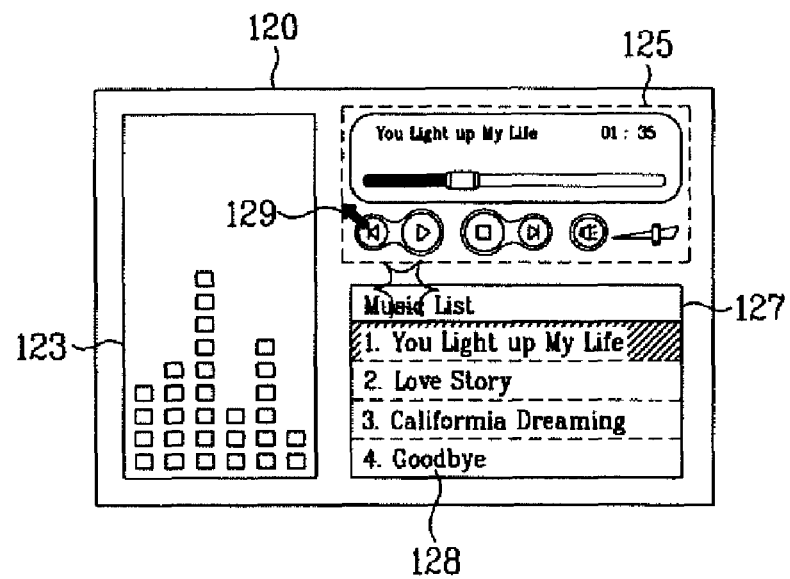

The reason why the cursor 129 is spaced apart from the touched point by the predetermined distance and position is to prevent the cursor 129 from being fully or partially covered by the user's finger when the cursor 129 is located at the location touched by the user's finger. The position of the cursor 129 may be set to any position, however, it is assumed that for the purpose of example the cursor's position according to the present invention is set at about 10 o'clock, as shown in FIG. 4B.

In one embodiment, the user of the mobile communication terminal may move the above-mentioned touched location toward another position of about 5 o'clock to select the above-mentioned target music item 128. However, if the target music item 128 is located at a right lower part, it would be difficult to fully move the touched location to another location so as to allow the cursor 128 to be placed on the target music item 128, because the touched point will need to be located outside of the touch-screen area in order to place the cursor on the target music item 128.

In other words, when an item is positioned at a corner or close to the border of the screen, a dead zone will result, such that a user cannot move the cursor over the objects displayed in the dead zone. In order to solve the problems associated with the dead zone, a second preferred embodiment of the present invention provides a method for allowing the user to adjust the cursor's position within the dead zone.

Depending on implementation, various methods for adjusting the cursor's position may be employed. For example, in one or more embodiments, it is determined whether the cursor's position is proper such that the target music item located in a dead zone is accurately selected (S530). If the cursor's position is improper, the user of the mobile communication terminal 100 attempts to adjust the cursor position (S540) by, for example, tapping the touch-screen 120 at predetermined time intervals (e.g., about 0.5 second intervals or less).

Figure 4C:
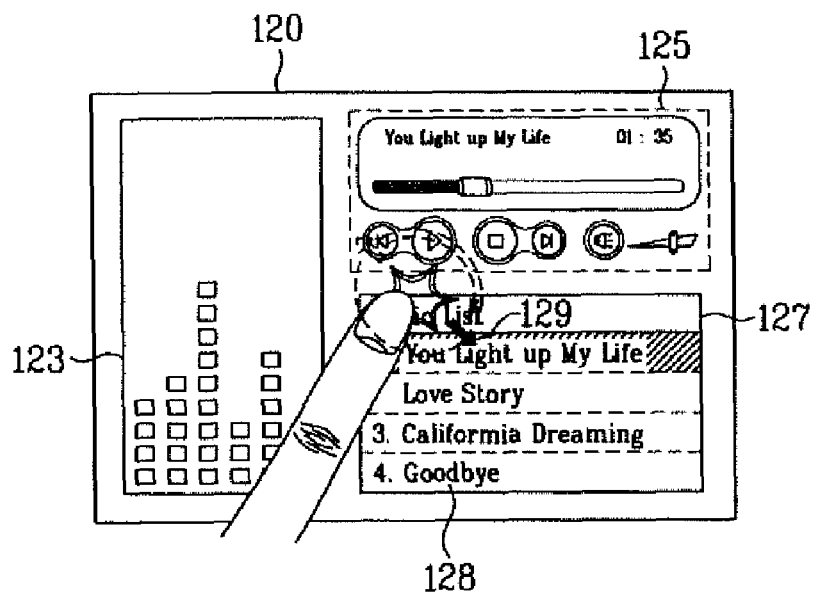
Figure 4D:
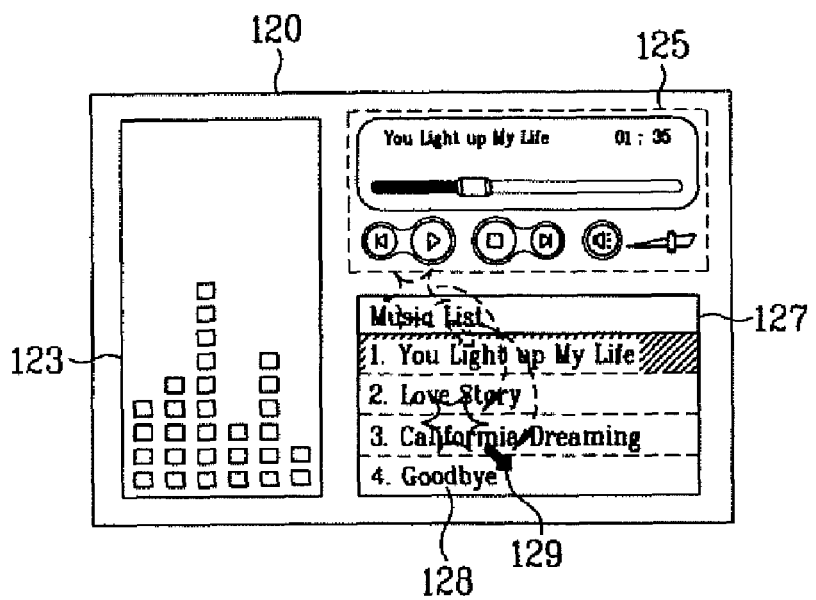

As a result, the cursor's position rotates in, for example, a clockwise direction as shown in FIG. 4C. The user of the mobile communication terminal 100 continuously taps the touch-screen 120 until the cursor's position reaches a desired position on the display. If the cursor's position reaches the desired position, the user of the mobile communication terminal stops tapping the touch-screen 120, as shown in FIG. 4D.

Figure 4E:
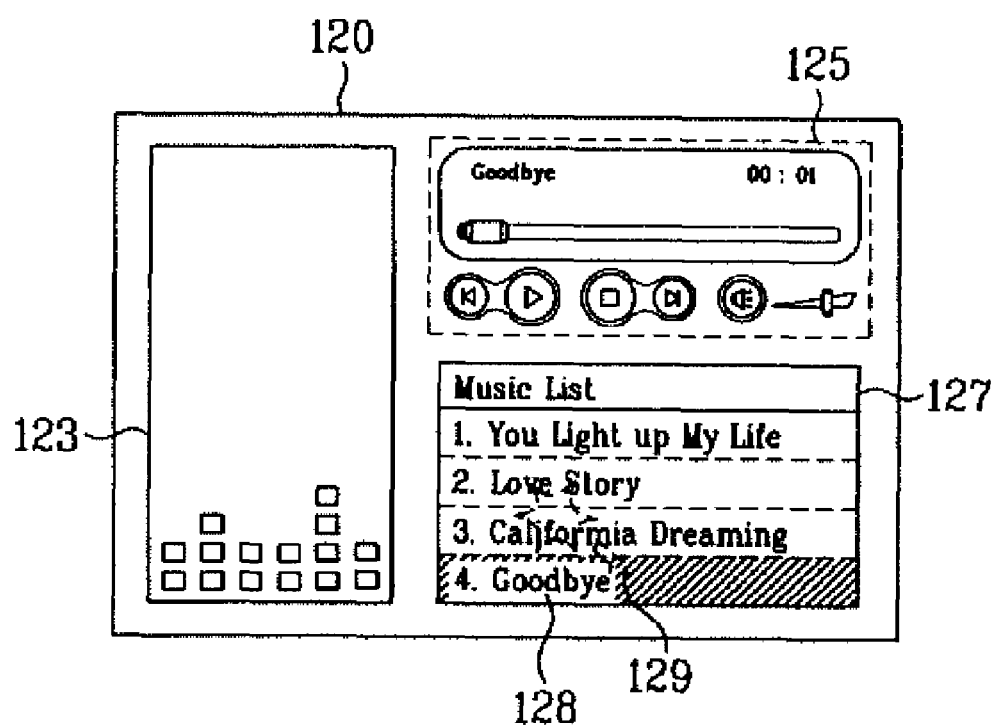
Figure 5:
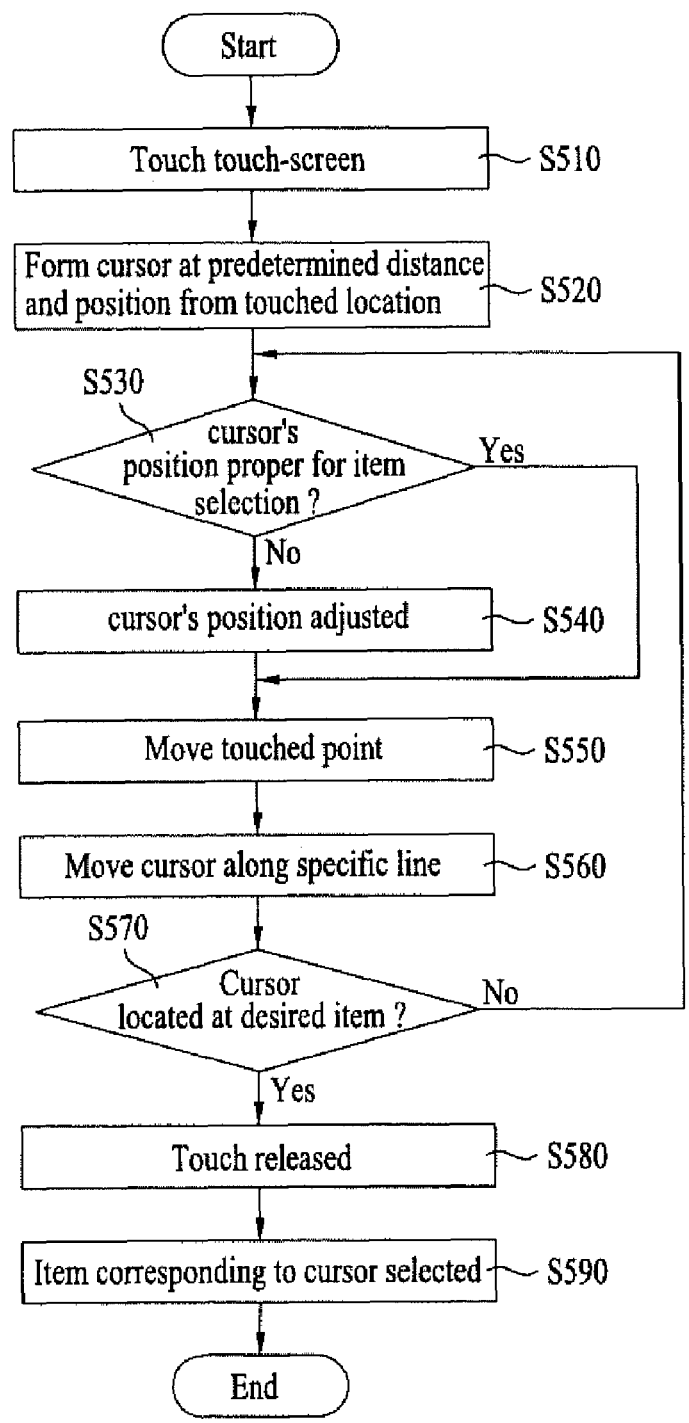
FIG. 5 is a flow chart illustrating an item selection method according to the second preferred embodiment.

The user of the mobile communication terminal may move the touched point to another point by maintaining the touching state on the touch-screen 120, such that the cursor is located at the target music item 128 (S550). If the cursor is not located at the target music item 128 (570), the above-mentioned steps S530-S560 are repeated. If the cursor is located at the target music item 128, the user of the mobile communication terminal 100 can take his or her finger off of the touch-screen 120 (S580), such that the above-mentioned target music item 128 is selected (S590), as shown in FIG. 4E.

As described above, the above-mentioned second preferred embodiment of the present invention has disclosed the cursor's position adjustment method executed before the user moves the touched point to another point after the cursor has been formed. However, it should be noted that the above-mentioned cursor's position adjustment may also be executed during the user's moving from the touched point to a new point or after the user's finger is completely located at the new point.

The target music item 128 may be selected when the user takes his or her finger off of the touch-screen 120, or it may also be selected by an additional input unit of the mobile communication terminal 100. The item selection method and the terminal for implementing the same according to the present invention can allow a user to easily select a desired item from among a variety of small-sized items displayed on a touch-screen without using a stylus pen. Therefore, although the user of the mobile communication terminal does not carry a stylus pen capable of selecting small-sized item, the user can easily select a desired item from among all items displayed on the touch-screen using his or her finger.

Although the present invention has been disclosed by way of example as applicable to a touch-screen display, it should be noted that the scope of the present invention is not limited to the above-mentioned example. Accordingly, the principals and concepts in this disclosure can be applied in other contexts. For example, if the cursor is located at a specific item, the specific item may be highlighted, such that the user can visually recognize which one of items has been selected by referring to the highlighted item.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for managing a graphical user interface (GUI) pointer on a touch sensitive screen of a mobile communication terminal, the method comprising:

generating a pointer to be displayed on a first display point on the screen, in response to a user touching the screen at a first touch point on the screen;

receiving tapping of the first touch point on the screen;

rotating the pointer continuously around the tapped first touch point in a clockwise or counterclockwise direction while the tapping continues;
stopping the rotation of the pointer when the tapping stops; and
selecting a target object at which the pointer is located in response to the user no longer touching the screen, the pointer displayed at the target object disappearing from the screen at the same time when the target object is selected,
wherein a pointer-generated location of the first display point on the screen is pre-determined and independent of the location of the first touch point on the screen, and
wherein the first display point is a first distance away from the first touch point.

2. The method of claim 1, further comprising touching the screen on a second touch point for moving the pointer from the first display point to a second display point, wherein the second display point is the first distance away from the second touch point, and the pre-determined location of the first display point on the screen where the pointer is generated is at a substantially central portion of the screen.

3. The method of claim 2, wherein the moving comprises dragging the pointer from the first display point to the second display point by sliding a pointing object on the touch sensitive screen from the first touch point to the second touch point.

4. The method of claim 2, wherein a pointing object is used to touch the screen and, due to the first and second display points being the first distance away from the first and second touch points, respectively, on the screen, the pointer displayed on the screen is visible to the user without the pointing object obstructing the user's view of the pointer.

5. The method of claim 2, further comprising receiving input in a first manner to move the pointer from the second display point to a third display point, wherein the third display point is a second distance away from the second touch point and wherein the second distance is longer than the first distance.

6. The method of claim 2, further comprising receiving input in a first manner to move the pointer from the second display point to a third display point, wherein the third display point is a second distance away from the second touch point and wherein the second distance is shorter than the first distance.

7. The method of claim 2, further comprising receiving input in a first manner to move the pointer from the second display point to a third display point where a GUI object is displayed.

8. The method of claim 2, wherein in response to a pointing object contacting the second touch point in a first manner, the pointer moves from the first distance away from the second touch point to a second distance away from the second touch point.

9. The method of claim 1, wherein the pointer includes an arrowhead portion pointing in a first direction upon being generated in response to the user touching the screen at the first touch point on the screen, the arrowhead portion pointing in a direction that is different from the first direction upon stopping the rotation of the pointer.

10. The method of claim 1, wherein the pointer is not displayed prior to the user touching the screen at the first touch point on the screen.

11. The method of claim 1, wherein the selected target object is highlighted.

12. A method for selecting a graphical user interface (GUI) object on a display screen of a mobile communication terminal, the method comprising:
generating a pointer to be displayed on the display screen at a first display point, in response to a user touching the display screen at a first touch point on the display screen, wherein a pointer-generated location of the first display point on the display screen is pre-determined and independent of a location of the first touch point on the display screen, wherein the first display point is a first distance away from the first touch point;
receiving tapping of the first touch point on the screen;
rotating the pointer continuously around the tapped first touch point in a clockwise or counterclockwise direction while the tapping continues;
stopping the rotation of the pointer when the tapping stops;
moving the pointer proximate to the GUI object on the display screen in response to the user touching the display screen at a second touch point; and
selecting the GUI object in response to the user no longer touching the display screen at the second touch point, corresponding to the pointer being displayed at a location of the GUI object, the pointer displayed at the location of the GUI object disappearing from the display screen at the same time when the GUI object is selected.

13. The method of claim 12, wherein touching the display screen at the second touch point in a first manner causes the pointer to move toward a closest GUI object in the vicinity of the pointer.

14. The method of claim 13, wherein touching in the first manner comprises continued touching of the display screen for a predetermined time period.

15. The method of claim 12, wherein the pointer is not displayed prior to the user touching the screen at the first touch point on the screen.

16. The method of claim 12, wherein the selected GUI object is highlighted.

17. A system for selecting a graphical user interface (GUI) object on a display screen of a mobile communication terminal, the system comprising:
a logic unit for generating a pointer to be displayed on the display screen at a first display point, in response to a user touching the display screen at a first touch point on the display screen, wherein a pointer-generated location of the first display point on the display screen is predetermined and independent of a location of the first touch point on the display screen, wherein the first touch point is a first distance away from the location of the first display point on the display screen, the first distance corresponding to an initial distance between the first touch point and the first display point;
a logic unit for rotating the pointer around the first touch point in a clockwise or counterclockwise direction in response to tapping of the first touch point, the pointer rotating continuously while the tapping continues, and stopping the rotation of the pointer when the tapping stops;
a logic unit for moving the pointer proximate to the GUI object on the display screen, in response to a user touching the display screen at a second touch point; and
a logic unit for selecting the GUI object in response to the user no longer touching the display screen at the second touch point, corresponding to the pointer being displayed at a location of the GUI object, the pointer displayed at the location of the GUI object disappearing from the display screen at the same time when the GUI object is selected.

18. The system of claim 17, wherein touching the display screen at the second touch point in a first manner causes the pointer to move toward a closest GUI object in the vicinity of the pointer.

19. The system of claim 18, wherein touching in the first manner comprises continuing to touch the display screen for a predetermined time period.

20. The system of claim 17, wherein the pointer is not displayed prior to the user touching the screen at the first touch point on the screen.

21. The system of claim 17, wherein the selected GUI object is highlighted.

22. A system for managing a graphical user interface (GUI) pointer on a touch sensitive screen of a mobile communication terminal, the system comprising:

- a logic unit for generating the GUI pointer to be displayed on a first display point on the screen in response to a user touching the screen at a first touch point on the screen, wherein a pointer-generated location of the first display point on the screen is predetermined and independent of a location of the first touch point on the screen, wherein the first display point is a first distance away from the first touch point;
- a logic unit for rotating the pointer around the first touch point in a clockwise or counterclockwise direction in response to tapping of the first touch point, the pointer rotation continuously while the tapping continues, and stopping the rotation of the pointer when the tapping stops; and
- a logic unit for selecting a GUI object at which the pointer is located in response to the user no longer touching the screen, the pointer displayed at the GUI object disappearing from the screen at the same time when the GUI object is selected.

23. The system of claim 22, wherein the GUI pointer is not displayed prior to the user touching the screen at the first touch point on the screen.

24. The system of claim 22, wherein the selected GUI object is highlighted.

* * * * *